United States Patent
Noji

(10) Patent No.: US 7,356,520 B2
(45) Date of Patent: Apr. 8, 2008

(54) COMPUTER SYSTEM FOR GENERATION OF TABLE DATA APPLICABLE TO MANAGEMENT OF ENTERPRISES

(76) Inventor: Fukuzo Noji, 5-1, Nisiharadai 2-chome, Iwatsuki-shi, Saitama 339-0082 (JP)

( * ) Notice: Subject to any disclaimer, the term of this patent is extended or adjusted under 35 U.S.C. 154(b) by 472 days.

(21) Appl. No.: 10/490,279

(22) PCT Filed: Sep. 5, 2002

(86) PCT No.: PCT/JP02/09061

§ 371 (c)(1),
(2), (4) Date: Mar. 22, 2004

(87) PCT Pub. No.: WO03/027925

PCT Pub. Date: Apr. 3, 2003

(65) Prior Publication Data

US 2004/0243594 A1 Dec. 2, 2004

(30) Foreign Application Priority Data

Sep. 21, 2001 (JP) .............................. 2001-290173

(51) Int. Cl.
*G06F 17/00* (2006.01)
*G06N 5/02* (2006.01)
(52) U.S. Cl. .............................. 706/46; 706/12; 706/14
(58) Field of Classification Search .................. 706/46, 706/12, 14; 707/101
See application file for complete search history.

(56) References Cited

U.S. PATENT DOCUMENTS

| | | | |
|---|---|---|---|
| 6,523,030 B1* | 2/2003 | Horowitz | 707/5 |
| 6,687,705 B2* | 2/2004 | Agrawal et al. | 707/101 |
| 6,847,974 B2* | 1/2005 | Wachtel | 707/101 |
| 7,024,414 B2* | 4/2006 | Sah et al. | 707/101 |
| 7,054,852 B1* | 5/2006 | Cohen | 707/2 |
| 2002/0002555 A1* | 1/2002 | Wolman et al. | 707/101 |
| 2003/0023609 A1* | 1/2003 | Della-Libera et al. | 707/101 |
| 2003/0101238 A1* | 5/2003 | Davison | 709/219 |

* cited by examiner

*Primary Examiner*—Joseph P Hirl
(74) *Attorney, Agent, or Firm*—Lowe Hauptman Ham & Berner, LLP

(57) ABSTRACT

Due to differences in the economic environment and other circumstances in a company, individual businesses create data with various attributes and the like. For this reason, companies have not always been able to make full use of their corporate data in association with various corporate data provided from external organizations. Therefore, the present invention provides a system facilitating the analysis of company data while incorporating external data. Using n-row by m-column two-dimensional tabular data, the system sets totaled values for columns to internal data and totaled values for rows to external data and calculates the values of cells, while performing analyses associated with the external data. The system calculates values in six cells from two sets of tabular data condensed to two rows and three columns and calculates the values in each cell of the n-row, n-column original table.

8 Claims, 9 Drawing Sheets

Average in-house tabular data

| | Product A | Product B | Product C | Product D | Total |
|---|---|---|---|---|---|
| Retailer 1 | | | | | |
| Retailer 2 | | | | | |
| Retailer 3 | | | | | |
| Retailer 4 | | | | | |
| Total | | | | | |

External data

| Total product purchase amounts by end-user based on compiled and sorted data from the retailers |
|---|
| User a |
| User b |
| User c |
| User d |
| User e |
| User f |

(modified)

Fig. 2 n-row, m-column two-dimensional tabular data

100

|  | Col 1 | Col 2 | Col 3 | Col 4 |  | Col j |  | Col m | Total |
|---|---|---|---|---|---|---|---|---|---|
| Row 1 | $s_{11}$ | $s_{12}$ | $s_{13}$ | $s_{14}$ |  | $s_{1j}$ |  | $s_{1m}$ | $y_{t1}$ |
| Row 2 | $s_{21}$ | $s_{22}$ | $s_{23}$ | $s_{24}$ |  | $s_{2j}$ |  | $s_{2m}$ | $y_{t2}$ |
|  |  |  |  |  |  |  |  |  |  |
| Row i | $s_{i1}$ | $s_{i2}$ | $s_{i3}$ | $s_{i4}$ |  | $s_{ij}$ |  | $s_{im}$ | $y_{ti}$ |
|  |  |  |  |  |  |  |  |  |  |
| Row n | $s_{n1}$ | $s_{n2}$ | $s_{n3}$ | $s_{n4}$ |  | $s_{nj}$ |  | $s_{nm}$ | $y_{tn}$ |
| Total | $x_{t1}$ | $x_{t2}$ | $x_{t3}$ | $x_{t4}$ |  | $x_{tj}$ |  | $x_{tm}$ | Sum total |
| Basic unit | $P_1$ | $P_2$ | $P_3$ | $P_4$ |  | $P_j$ |  | $P_m$ |  |

Fig. 3

P(0) table (n-row, m-column data condensed to 2 rows and 3 columns using P(0))

|  | 1st Col | 2nd Col | 3rd Col | Total |
|---|---|---|---|---|
| 1st Row | $s_{11}'$ | $s_{12}'$ | $s_{13}'$ | $y_{t1}'$ |
| 2nd Row | $s_{21}'$ | $s_{22}'$ | $s_{23}'$ | $y_{t2}'$ |
| Total | $x_{t1}'$ | $x_{t2}'$ | $x_{t3}'$ | Sum total |
| Basic unit | $P_1'$ | $P_2'$ | $P_3'$ |  |

— 300

$x_{t1}' = x_{t1}$
$x_{t2}' = P(0) (x_{t2}/P_2 + x_{t3}/P_3 + \cdots + x_{t,m-1}/P_{m-1})$
$x_{t3}' = (P_2 - P(0))(x_{t2}/P_2) + (P_3 - P(0))(x_{t3}/P_3) + \cdots + (P_{m-1} - P(0))(x_{t,m-1}/P_{m-1}) + x_{tm}$
$y_{t1}' = y_{t1}$
$y_{t2}' = y_{t2} + \cdots + y_{tn}$
$P_1' = P_1$
$P_2' = P(0)$

Fig. 4

P(2) table (n-row, m-column data condensed to 2 rows and 3 columns using P(2))

|  | 1st Col | 2nd Col | 3rd Col | Total |
|---|---|---|---|---|
| 1st Row | $s_{11}''$ | $s_{12}''$ | $s_{13}''$ | $y_{t1}''$ |
| 2nd Row | $s_{21}''$ | $s_{22}''$ | $s_{23}''$ | $y_{t2}''$ |
| Total | $x_{t1}''$ | $x_{t2}''$ | $x_{t3}''$ | Sum total |
| Basic unit | $P_1''$ | $P_2''$ | $P_3''$ |  |

← 400

$$x_{t1}'' = x_{t1}$$
$$x_{t2}'' = P(2)\,(x_{t2}/P_2 + x_{t3}/P_3 + \cdots + x_{t,m-1}/P_{m-1})$$
$$x_{t3}'' = (P_2 - P(2))(x_{t2}/P_2) + (P_3 - P(2))(x_{t3}/P_3) + \cdots + (P_{m-1} - P(2))(x_{t,m-1}/P_{m-1}) + x_{tm}$$
$$y_{t1}'' = y_{t1}$$
$$y_{t2}'' = y_{t2} + \cdots + y_{tn}$$
$$P_1'' = P_1$$
$$P_2'' = P(2)$$

Fig. 5

Equations using totaled values in 2-row, 3-column tabular data as known quantities and expressing six cell values with unknowns α and β

|  | 1st Col | 2nd Col | 3rd Col | Total |
|---|---|---|---|---|
| 1st Row | $x_{11}$ | $x_{12}$ | $x_{13}$ | d |
| 2nd Row | $x_{21}$ | $x_{22}$ | $x_{23}$ | e |
| Total | a | b | c | Sum total |

← 500 a, b, c, d, e     Known quantities
α, β     Unknown quantities
$x_{11} = -2(a+b+c) + 3d + \alpha$
$x_{21} = 3a + 2(b+c) - 3d - \alpha$
$x_{12} = 6a + 4(b+c) - 6d - 3\alpha + \beta$
$x_{22} = -6a - 3b - 4c + 6d + 3\alpha - \beta$
$x_{13} = -4a - 2(b+c) + 4d + 2\alpha - \beta$
$x_{23} = 4a + 2b + 3c - 4d - 2\alpha + \beta$

Fig. 6

Average in-house tabular data

| | Product A | Product B | Product C | Product D | Total |
|---|---|---|---|---|---|
| Retailer 1 | | | | | |
| Retailer 2 | | | | | |
| Retailer 3 | | | | | |
| Retailer 4 | | | | | |
| Total | | | | | |

(modified)

External data

| Total product purchase amounts by end-user based on compiled and sorted data from the retailers |
|---|
| User a |
| User b |
| User c |
| User d |
| User e |
| User f |

Fig. 7

> Flow of operations performed by the computer system for generating tabular data, part I

---

In order to generate tabular data incorporating external data to be analyzed, a company analyst reads external data from the external information storage medium 90, compiles and sorts the data, and stores the data in the total values one-dimensional data table 21y according to external data attributes. (S71)

---

One-dimensional data for total values is stored in the total values one-dimensional data table 21x according to in-house attributes. (S72)

---

The computer system 1 displays a settings input window and stores in the initial settings table 21a inputted internal data and rearrangement data for external data, rows and columns indicating the cell range for finding solutions, and the order for calculating the cells $s_{ij}$ within the range. (S73)

---

The computer system 1 performs corrections such that the specified total values $x_{ij}$ for internal data are divisible by the basic units $P_j$. Error differences are distributed among each row. The same correction is performed when the sum total of $y_{ij}$ is different from the sum total of $x_{ij}$. When the error value does not exceed twice the minimum value of $P_j$, correction is kept to one line. (S74)

Example of n-row, m-column two-dimensional tabular data

|  | Col. A | Col. B | Col. C | Col. D | Col. E | Total |
|---|---|---|---|---|---|---|
| Row 1 |  |  |  |  |  | 679628 |
| Row 2-5 |  |  |  |  |  | Remainder |
| Total | 1789*264 | 1489*119 | 901*58 | 2379*256 | 237056 | Sum total 1547825 |

* indicates multiplication

Fig. 11

P(0) table condensed to 2 rows and 3 columns based on P(0)

|  |  | A | B-D | E | Total |
|---|---|---|---|---|---|
| P(0) table | 1 |  |  |  | 679628 |
|  | 2-5 |  |  |  |  |
|  | Total | 1789*264 | 1715*(119+58+256) | 237056 +Difference | 1547825 |

Difference = [(1489-1715)*119]+[(901-1715)*58]+[(2379-1715)*256]

P(2) table condensed to 2 rows and 3 columns based on P(2)

|  |  | A | B-D | E | Total |
|---|---|---|---|---|---|
| P(2) table | 1 |  |  |  | 679628 |
|  | 2-5 |  |  |  |  |
|  | Total | 1789*264 | 1863*(119+58+256) | 237056 +Difference | 1547825 |

Difference = [(1489-1863)*119]+[(901-1863)*58]+[(2379-1863)*256]

Fig. 12

Expressing cell values in P(0) table by α and β

| P(0) | A (1st Col.) | B-D (2nd Col.) | E (3rd Col.) |
|---|---|---|---|
| 1 (1st Row) | $x_{11}$<br>$-1056766+\alpha$ | $x_{12}$<br>$3058124-3\alpha+\beta$ | |
| 2-5 (2nd Row) | $x_{21}$<br>$1529062-\alpha$ | $x_{22}$<br>$-2315529+3\alpha+\beta$ | |
| | 472296 | 742595 | |

Expressing cell values in P(2) table by α and β"

| P(2) | A (1st Col.) | B-D (2nd Col.) | E (3rd Col.) |
|---|---|---|---|
| 1 (1st Row) | $x_{11}''$<br>$-1056766+\alpha$ | $x_{12}''$<br>$3058124-3\alpha+\beta''$ | |
| 2-5 (2nd Row) | $x_{21}''$<br>$1529062-\alpha$ | $x_{22}''$<br>$-2251445+3\alpha-\beta''$ | |
| | 472296 | 806679 | |

COMPUTER SYSTEM FOR GENERATION OF TABLE DATA APPLICABLE TO MANAGEMENT OF ENTERPRISES

TECHNICAL FIELD

Normally, numerical data used in corporate management is compiled and sorted based on attributes of the data and then arranged and displayed in a two-dimensional table format for use in economic analysis. The present invention relates to a computer system for generating tabular data in a matrix form of columns and rows including totaled values for each column, compiled based on attributes within a business, and totaled values for each row, compiled based on attributes set outside the business. The computer system includes means for finding a numerical value in each cell intersected by the rows and columns of the table based on the totaled values for each column and each row.

BACKGROUND ART

In conventional systems that create tabular data for use in a two-dimensional table format, individual data entries are generally sorted into fixed categories matching the attributes of the data to the objective. Numerical values for each data element are added up according to each category and compiled in a table format.

However, as the economic situation and business environment changes, it is often difficult to create tabular data on an in-house analytical computer system employing the conventional categories established by the company when attempting to import information from outside the company. Reconstructing this in-house analytical system to overcome these difficulties would require much time and expense.

Therefore, a method is needed for creating desired tabular data comprising numerical data with prices, unit cost, and the like, without modifying the individual data in the in-house analytical system. The tabular data must incorporate external information while also taking advantage of the totaled values in the conventional in-house categories.

FIG. 6 shows an example of sales data described below. The table on the left in FIG. 6 shows in-house data for an average company. In this table, the columns indicate different products produced by the company (A, B, C, and D), with the total sales for each product indicated at the bottom of the corresponding column. The rows divide the sales by retailer (1, 2, 3, and 4), with total sales for each retailer indicated in the right-hand cell of the corresponding row.

The table on the right in FIG. 6 shows total sales for each end-user that have been recompiled and sorted for different categories based on data from the retailers. In other words, FIG. 6 shows a case in which sales data organized by end-user was received from retailers 1, 2, 3, and 4, and two-dimensional tabular data was newly created with the columns of product categories and rows of sales data according to end-user. In this example, the totaled values in the columns of the in-house table are still used, but the totaled data in the rows is rearranged in the external data.

The in-house system cannot always be used immediately after performing this type of rearrangement. It is particularly difficult to use the in-house system when modifying attributes of external data to suit the conditions.

In view of the foregoing, it is an object of the present invention to provide a system capable of overcoming problems in conventional computing methods for finding numerical values in each cell of a table based on row and column data, the finding of which numerical data has been considered difficult when the row totals are rearranged in external data, as described above. The system of the present invention can incorporate social and economic data supplied from various institutions including public organizations in data of the in-house system and can compile and analyze in-house data under new attributes not stored in the in-house system.

DISCLOSURE OF THE INVENTION

A computer system according to the present invention generates tabular data used in corporate management, the tabular data comprising cell data $s_{ij}$ (where i=1, 2, ..., and n; and j=1, 2, ..., and m) arranged two-dimensionally in n rows and m columns and including numerical data used in corporate management that has been compiled and sorted based on attributes for the rows and columns; two sets of one-dimensional data having different attributes that include totaled values $y_{ti}$ (where i=1, 2, ..., and n) for the m cell values in each row and totaled values $x_{tj}$ (where j=1, 2, ..., and m) for the n cell values in each column; and one-dimensional data for basic units $P_j$ (where j=1, 2, ..., and m), which are constant quantities shared in the respective columns such that the values in the n cells of each column are multiples of the constant quantity and the prime factors of the constant quantities in each column differ at least partially. The constant quantities are composed of prime factors $F_i$(i=1, 2, ..., r) and a power of each prime factor $F_i$. The totaled values $x_{tj}$ and their basic units $P_j$ are compiled based on company attributes determined in-house, while the totaled values $y_{ti}$ are set to one-dimensional data compiled according to attributes set outside of the company.

The computer system comprises various means for finding partial data, wherein the values $x_{tj}$, $P_j$, and $y_{ti}$ are known quantities and the cell data $s_{ij}$ for each of the n×m cells are unknown quantities. The computer system comprises initializing means for setting internal data and modified data for external data, displaying a settings input window for inputting rows and columns indicating a range of the cells for which a solution is to be found and the order for selecting rows and columns within that range, and storing the inputted data in an initial settings table; basic units plus/minus differential generating means for selecting one column from the initial settings table according to the selection order set by the initializing means, setting $P_1$ to the basic units $P_i$ of the totaled value $x_{ti}$ in the selected column, and generating two basic units P(0) and P(2) having the same differential with $P_1$, but one being less than $P_1$ and the other greater; P(0) table generating means for creating a 2-row, 3-column condensed table using P(0) by setting a totaled value $y_{t1}'$ in the first row of a P(0) table to the value of $y_{ti}$ in the selected row, setting a totaled value $y_{t2}'$ in the second row to the total of all values $y_{t2}$-$y_{tm}$ of rows not selected; setting a totaled value $x_{t1}'$ in the first column of the P(0) table to the value of $x_{tj}$ in the selected row, setting a totaled value $x_{t2}'$ in the second column to a value found from the expression P(0) $(x_{t2}/P_2+x_{t3}/P_3+ \ldots +x_{t,m-1}/P_{m-1})$ using the totaled values $x_{t2}, x_{t3}, x_{t4}, \ldots$ for all columns not selected, but excluding the totaled value $x_{tm}$ in the final column, and setting a totaled value $x_{t3}'$ in the third column to a value found the expression $(P_2-P(0))(x_{t2}/P_2)+(P_3-P(0))(x_{t3}/P_3)+ \ldots +(P_{m-1}-P(0))(x_{t,m-1}/P_{m-1})+x_{tm}$ to condense the original table to three columns; P(2) table generating means for generating a 2-row, 3-column condensed table according to the same method as the P(0) table generating means described above, but using P(2) in place of P(0); 2-row, 3-column condensed table cell value displaying means that expresses the six cell values $x_{ij}$ (for line numbers i=1 and 2 and column numbers j=1, 2, and 3) according to the following equations, using known quantities a, b, and c as the totaled values for the first, second, and third columns in the 2-row by 3-column condensed table and known quantities d and e as the totaled values in the first and second rows, and employing unknown quantities $\alpha$ and $\beta$:

$$x_{11}=-2(a+b+c)+3d+\alpha$$

$$x_{21}=3a+2(b+c)-3d-\alpha$$

$$x_{12}=6a+4(b+c)-6d-3\alpha+\beta$$

$$x_{22}=-6a-3b-4c+6d+3\alpha-\beta$$

$$x_{13}=-4a-2(b+c)+4d+2\alpha-\beta$$

$$x_{23}=4a+2b+3c-4d-2\alpha+\beta;$$

n12 generating means for generating a unit quantity n12 for the cells $s_{12}'$ and $s_{12}''$ in the corresponding P(0) and P(2) tables by totaling the unit quantities for all cells of the original tabular data prior to condensing the data, from the cell $s_{12}$ in the first row and the second column to the cell $s_{1,m-1}$ in the first row and $(m-1)^{th}$ column but excluding the cell $s_{1m}$ in the final column, according to the equation n12=$s_{12}/P_2+s_{13}/P_3+ \ldots +s_{1,m-1}/P_{m-1}$; first n12 solution sequence calculating means for finding solutions of cell unit quantities n12 based on the $P_1$ setting by calculating the residue class of the cell unit quantities n12 mod $P_1$ based on the totaled values for each of the 2-row, 3-column condensed P(0) and P(2) tables and the basic units $P_1'$, P(0), and P(2), and calculating and displaying a sequence that can be used as solutions for n12; second n12 solution sequence calculating means for calculating the cell unit quantities n12 based on a $P_1'$ setting by setting $P_1'$ to include factors relatively prime with $P_1$, generating two basic units P'(0) and P'(2) having the same differential with $P_1'$, with one less than $P_1'$ and the other greater, using the same means used for $P_1$, generating P'(0) and P'(2) tables condensed to two rows and three columns, calculating the residue class of n12 mod $P_1'$ based on the totaled values in the P'(0) and P'(2) tables and the basic units $P_1'$, P'(0), and P'(2), and calculating and displaying a sequence that can be used as solutions for n12; and selected n12 unit quantity sequential calculating means for fixing a unit quantity for the n12 of the current column selected by the initializing means if a unique solution exists in the overlapping area between the solution sequence for n12 based on the $P_1$ setting and the solution sequence for n12 based on the $P_1'$ setting found by the first and second solution n12 sequence calculating means, respectively, storing this quantity in a total results table, searching the initial settings table and reading the next column that should be selected in the order of calculation, moving the selected column to the first column and repeating each of the means described above to determine the unit quantity of n12; reading the selected column for the next row from the initial settings table if all unit quantities n12 have been determined for that column and repeating the means described above for determining the n12 unit quantity; and stopping data recording to the total results table after finding all unit quantities n12 in the cell range set in the initial settings table.

Further, the totaled values $x_{tj}$, one-dimensional data compiled in-house, indicate total sales for products sold to a plurality of retailers. The basic units $p_j$ indicate the unit costs of the sold products. The totaled values $y_{ti}$, one-dimensional data determined and compiled externally, indicate total sales by end-user that have been recategorized and ordered according to data received from each retailer.

Further, the n12 solution sequence calculating means sets a $P_1''$ having factors relatively prime with $P_1$ and $P_1'$ and repeats the process to calculate the n12 solution sequence if the n12 solution sequence according to the $P_1$ setting and the n12 solution sequence according to the P1' setting include a plurality of overlapping solutions.

BRIEF DESCRIPTION OF THE DRAWINGS

In the drawings:
FIG. 2 shows the general format for n-row, m-column two-dimensional tabular data;
FIG. 3 is a P(0) table formed by condensing n-row, m-column data to 2 rows and 3 columns using P(0);
FIG. 4 is a P(2) table formed by condensing n-row, m-column data to 2 rows and 3 columns using P(2);
FIG. 5 shows calculations using total values in the 2-row, 3-column tabular data as known quantities and expressing six cell values with unknowns $\alpha$ and $\beta$;
FIG. 6 shows a sample relationship between normal in-house tabular data and external data;
FIG. 7 shows the flow of operations performed by the computer system for generating tabular data, part I;
FIG. 10 is an example of n-row, m-column two-dimensional tabular data;
FIG. 11 shows examples of P(0) and P(2) tables condensed to 2 rows and 3 columns based on P(0) and P(2), respectively;
and
FIG. 12 is an example of expressing cell values in the P(0) and P(2) tables with two unknown quantities.

BEST MODE FOR CARRYING OUT THE INVENTION

A preferred embodiment of the present invention will be described with reference to the accompanying drawings.

Figure 1:
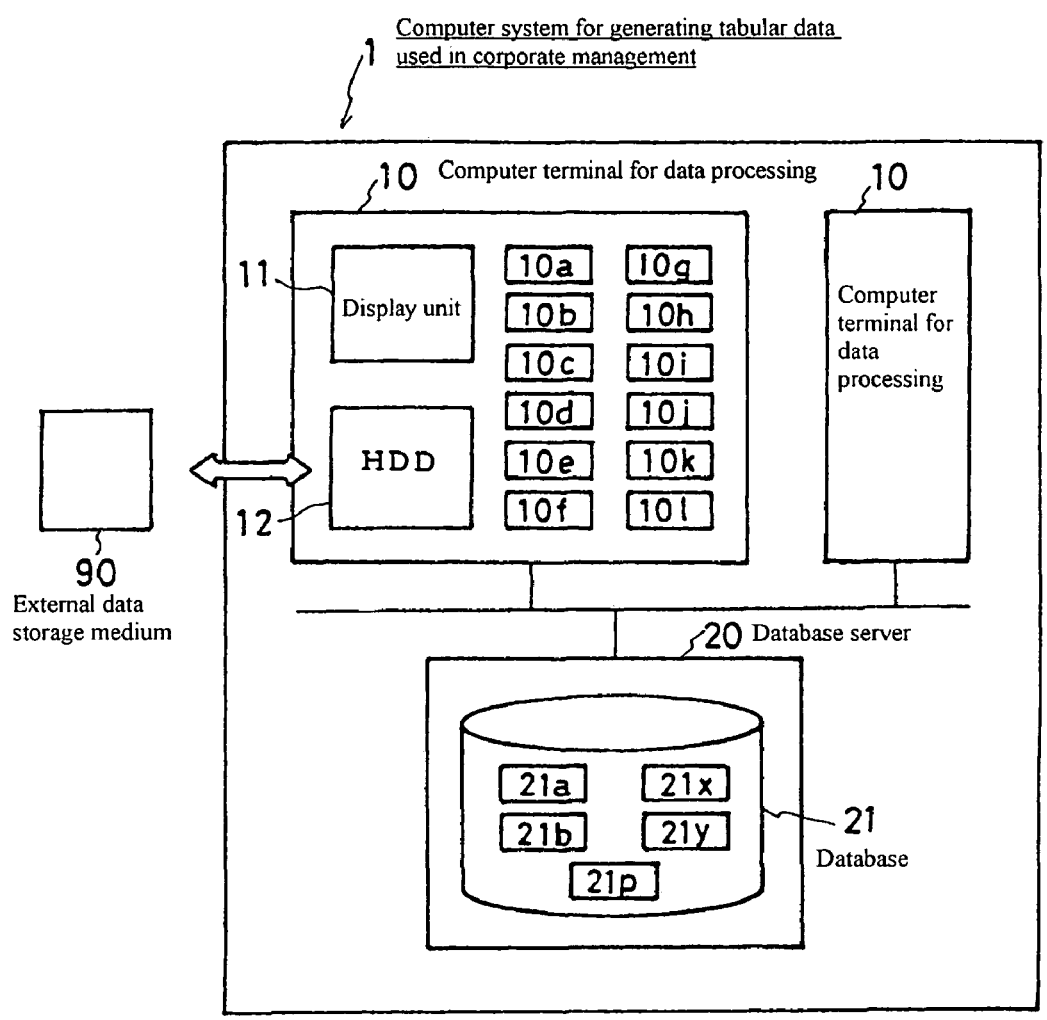
FIG. 1 is a block diagram showing a computer system for generating tabular data used in corporate management.

FIG. 1 is a block diagram showing a computer system 1 according to the present invention for generating tabular data used in corporate management. The computer system 1 according to the preferred embodiment includes one or more computer terminals 10 for data processing and a database server 20.

The database server 20 manages a database 21. The database 21 includes various tables required for generating tabular data, as will be described later.

Each of the computer terminals 10 includes at least a display unit 1, a hard disc drive 12 for storing external data read from an external data storage medium 90, and a software program 10a and various other means described later that are required for controlling the process of generating tabular data.

Before discussing how tabular data is generated by the computer system 1 described above, we will describe two-dimensional tabular data commonly used in corporate management. Tabular data such as n-row, m-column two-dimensional tabular data 100 shown in FIG. 2 includes numerical data used in corporate management. The tabular data includes cells $s_{ij}$ (where i=1, 2, . . . , and n; and j=~1, 2, . . . , and m) arranged two-dimensionally in n rows and m columns after being compiled and sorted based on attributes for the rows and columns; two sets of one-dimensional data having different attributes that include totaled values $y_{ti}$ (where i=1, 2, ..., and n) for the m cell values in each row and totaled values $x_{tj}$ (where j=1, 2, ..., and m) for the n cell values in each column; and one-dimensional data for basic units $P_j$ (where j=1, 2, ..., and m), which are constant quantities shared in the respective columns such that the values in the n cells of each column are multiples of the constant quantity that they share and the prime factors of the constant quantities in each column differ at least partially. The constant quantities are composed of prime factors $F_i$ (i=1, 2, ..., r) and a power of each prime factor $F_i$.

In this commonly used n-row, m-column two-dimensional tabular data 100, the totaled values $x_{tj}$ and their basic units $P_j$ are compiled based on company attributes determined in-house (for example, products sold by the company and the like), while the totaled values $y_{ti}$ are set to one-dimensional data compiled according to attributes set outside of the company (for example, information on end-user sales at retail outlets, including sales amounts by customer). The computer system 1 includes various means for finding unknown data quantities, wherein the values $x_{tj}$, $P_j$, and $y_{ti}$ are known quantities and the data $s_{ij}$ for each of the n×m cells are unknown quantities.

Next, the various means of the computer system 1 will be described in more detail.

The computer system 1 includes initializing means 10b for inputting internal data and modified data for external data, displaying a settings input window prompting the user to input rows and columns indicating the cell range for which a solution is to be found and the order for selecting rows and columns within that range, and storing the inputted data in an initial settings table 21a.

The computer system 1 also includes basic units plus/minus differential generating means 10c for selecting one column from the initial settings table 21a according to the selection order set by the initializing means 10b, setting $P_1$ to the basic units $P_j$ of the totaled value $x_{tj}$ in the selected column, generating two basic units P(0) and P(2) having the same differential with $P_1$, but one being less than $P_1$ and the other greater, and storing these basic units in a table 21P.

The computer system 1 also includes P(0) table generating means 10d for creating a 2-row, 3-column condensed table using P(0) stored in the condensed table 21P (see FIG. 3). Assuming that the totaled value $y_{ti}$ of the selected row is $y_{ti}$, the P(0) table generating means 10d sets a totaled value $y_{t1}'$ in the first row of the P(0) table to the value of $y_{ti}$ and sets a totaled value $y_{t2}'$ in the second row to the total of all values $y_{t2}$-$y_{tn}$ of rows not selected. Further, assuming that the totaled value $x_{tj}$ of the selected column is $x_{t1}$, then the P(0) table generating means 10d sets the totaled value $x_{t1}'$ in the first column of the P(0) table to the value of $x_{tj}$, sets a totaled value $x_{t2}'$ in the second column to a value found from the equation $P(0)(x_{t2}/P_2+x_{t3}/P_3+ \ldots +x_{tm-1}/P_{m-1})$ using the totaled values $x_{t2}, x_{t3}, x_{t4}, \ldots$ for all columns not selected, but excluding the value $x_{tm}$ in the final column, and sets a totaled value $x_{t3}'$ in the third column to a value found the equation $(P_2-P(0))(x_{t2}/P_2)+(P_3-P(0))(x_{t3}/P_3)+ \ldots +(P_{m-1}-P(0))(x_{tm-1}/P_{m-1})+x_{tm}$, thereby condensing the original table to three columns.

The computer system 1 also includes P(2) table generating means 10e for generating a 2-row, 3-column condensed table according to the same method as the P(0) table generating means 10d described above, but using P(2) in place of P(0) (see FIG. 4.)

The computer system 1 also includes 2-row, 3-column condensed table cell value displaying means 10f that expresses the six cell values $x_{ij}$ (for line numbers i=1 and 2 and column numbers j=1, 2, and 3) according to the following equations, using known quantities a, b, and c as the totaled values for the first, second, and third columns in the 2-row by 3-column condensed table and known quantities d and e as the totaled values in the first and second rows, and employing unknown quantities α and β (see FIG. 5).

$x_{11}=-2(a+b+c)+3d+\alpha$ $x_{21}=3a+2(b+c)-3d-\alpha$ $x_{12}=6a+4(b+c)-6d-3\alpha+\beta$ $x_{22}=-6a-3b-4c+6d+3\alpha-\beta$ $x_{13}=-4a-2(b+c)+4d+2\alpha-\beta$ $x_{23}=-4a+2b+3c-4d-2\alpha+\beta$ The computer system 1 also includes n12 generating means 10g for generating a unit quantity n12 for the cells $s_{12}'$ and $s_{12}''$ in the corresponding P(0) and P(2) tables by totaling the unit quantities for all cells of the original tabular data prior to condensing the data, from the cell $s_{12}$ in the first row and the second column to the cell $s_{1,m-1}$ in the first row and $(m-1)^{th}$ column but excluding the cell $s_{1m}$ in the final column, according to the following equation.

$n12=s_{12}/P_2+s_{13}/P_3+ \ldots +s_{1,m-1}/P_{m-1}$

The computer system 1 also includes n12 solution sequence calculating means 10h for finding solutions of cell unit quantities n12 based on the $P_1$ setting. The n12 solution sequence calculating means 10h calculates the residue class of the cell unit quantities n12 mod $P_1$ based on the totaled values for each of the two-row, three-column condensed P(0) and P(2) tables and the basic units $P_1$, P(0), and P(2). The means 10h then calculates and displays a sequence that can be used as solutions for n12.

The computer system 1 also includes n12 solution sequence calculating means 10i for calculating the cell unit quantities n12 based on the $P_1'$ setting. The n12 solution sequence calculating means 10i sets $P_1'$ to include factors relatively prime with $P_1$ and generates two basic units P'(0) and P'(2) having the same differential with $P_1'$, with one less than $P_1'$ and the other greater, using the same means used for $P_1$. Next, the n12 solution sequence calculating means 10i generates P'(0) and P'(2) tables condensed to two rows and three columns. The means 10i calculates the residue class of n12 mod $P_1'$ based on the totaled values in the P'(0) and P'(2) tables and the basic units $P_1'$, P'(0), and P'(2). The means 10i then calculates and displays a sequence that can be used as solutions for n12.

Calculations of the n12 solution sequence performed by the means 10h and 10i will be described later in greater detail.

The computer system 1 also includes selected n12 unit quantity sequential calculating means 10j. If a unique solution exists in the overlapping area between the solution sequence for n12 based on the $P_1$ setting and the solution sequence for n12 based on the $P_1'$ setting found by the means 10h and 10i, respectively, the selected n12 unit quantity sequential calculating means 10j fixes this unit quantity for the n12 of the current column selected based on the initializing means 10b and stores this quantity in a total results table 21b. The means 10j searches the initial settings table 21a and reads the next column that should be selected in the order of calculation. The selected column is moved to the first column and each of the means described above for determining the unit quantity of n12 is repeated. If all unit quantities n12 have been determined for that row, then the means 10*j* reads the selected column for the next row from the initial settings table 21*a* and repeats the means described above for determining the n12 unit quantity. After determining all unit quantities n12 in the selected rows and columns set in the initial settings table 21*a*, the selected n12 unit quantity sequential calculating means 10*j* stops writing data to the total results table 21*b*.

The n12 solution sequence calculating means 10*i* sets a $P_1''$ to have relatively prime factors with $P_1$ and $P_1'$ unless there is no sole duplicated solution in the n12 solution sequences according to the $P_1$ setting and the $P_1'$ setting, respectively. The means 10*i* repeats the n12 solution sequence calculation to find a unique solution in the n12 solution sequence.

The computer system 1 also includes a selected column n12 unit quantity calculating means 10*k* that sequentially reads n×m n12 unit quantities stored in the total results table 21*b* that were calculated by the selected n12 unit quantity sequential calculating means 10*j* and sets the n12 unit quantity for each column as $n12_{(1)}, n12_{(2)}, \ldots,$ and $n12_{(m)}$. Also, if the value found by dividing the total of these n12 unit quantities by (m−1) is denoted as T, then the following is obtained.

$$T-n12_{(1)}=n1 (\text{first column})$$

$$T-n12_{(2)}=n2 (\text{second column})$$

. . .

$$T-n12_{(m)}=nm (m^{th} \text{ column})$$

The computer system 1 also includes a total selected range n12 unit quantity calculating means 10*l* for performing the selected column n12 unit quantity calculating means 10*k* calculation for each row.

Next, the flow of operations performed by the computer system 1 according to the present invention will be described with reference to FIGS. 7, 8, and 9.

Prior to creating tabular data with the computer system 1, in S71 and S72 of FIG. 7 a totaled values one-dimensional data table 21*x* based on in-house attributes and a totaled values one-dimensional data table 21*y* based on external attributes are pre-stored in the database 21 of the computer system 1.

S73 of FIG. 7 indicates the initializing means 10*b*. S74 of FIG. 7 indicates a correction process for distributing error among the rows in order to achieve consistency between the external data and internal data prior to beginning the calculations.

Figure 8:
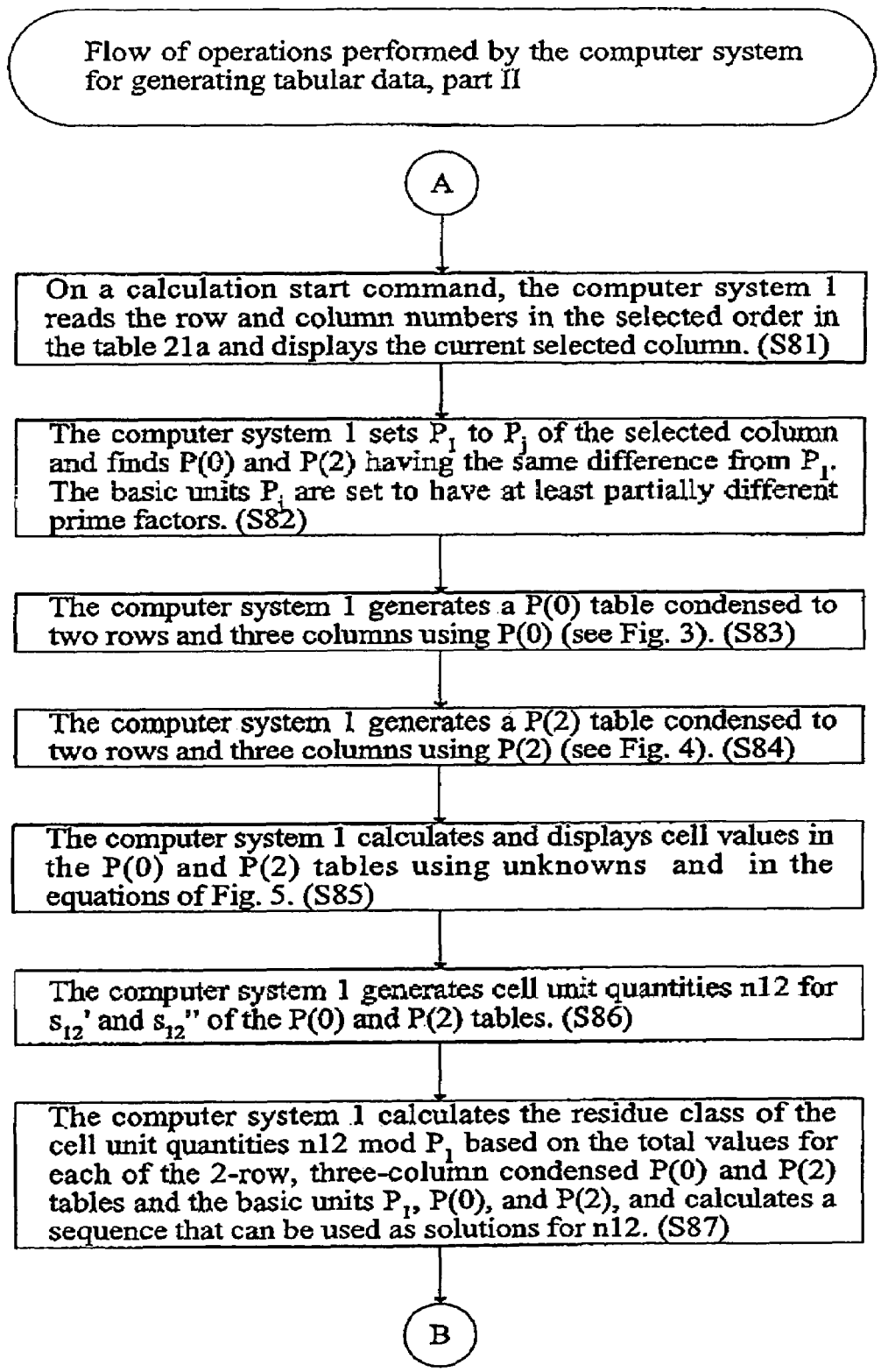
FIG. 8 shows the flow of operations performed by the computer system for generating tabular data, part II.

In S81 of FIG. 8, the computer system 1 displays cells to be automatically calculated and performs calculations upon receiving a command to begin calculations.

S82 indicates the basic units plus/minus differential generating means 10*c*. S83 and S84 indicate the P(0) table generating means 10*d* and P(2) table generating means 10*e*, respectively. FIGS. 3 and 4 show the resulting tables after the means 10*d* and 10*e* condenses the table to 2 rows and 3 columns.

S85 indicates the 2-row, 3-column condensed cable cell value displaying means 10*f*, which uses the unknown quantities α and β to calculate the six cell values in the 2-row, 3-column condensed P(0) and P(2) tables.

S86 indicates the n12 generating means 10*g*. S87 and S91 of FIG. 9 indicate the n12 solution sequence calculating means 10*h* and n12 solution sequence calculating means 10*i* according to the $P_1$ and $P_1'$ settings, respectively.

In S92-S94 indicate the selected n12 unit quantity sequential calculating means 10*j*. In S92 the computer system 1 compares the n12 solution sequence based on the $P_1$ setting and the $P_1'$ setting. If a unique solution can be found in the two sequences, the quantity is set as the solution. If a unique solution does not exist, in S93 the computer system 1 sets a $P_1''$, generates an n12 solution sequence, and repeats the process until a unique solution is found. When a unique solution is found, in S94 the unique solution is stored in the total results table 21*b*, the next selected column is read from the initial settings table 21*a* and the means are repeated until the n12 unit quantities for all rows and columns in the entire range sequentially selected from the total results table 21*b* are stored.

In S95, if all n12 unit quantities are stored, the n12 unit quantities in the rows and columns of the entire selected range and the values for each cell are calculated and displayed.

When creating tabular data condensed to two rows and three columns, as described above, the data is condensed and converted for the following reason. Since the basic units $P_1, P_2, \ldots,$ and $P_j$ in the n-row, m-column source table of FIG. 2 must include relatively prime numbers, there is no particular association between values in the cells of each column in the original table.

The data becomes very easy to handle when the original source table is condensed to two rows and three columns, as shown in FIGS. 3 and 4, to create a table with a fixed mathematical relationship between cells of the first column and cells of the second column. By establishing this relationship between the first and second columns, the third column can be determined easily because the sum of totaled values is already known. Since the unit quantities n12 calculated by dividing each cell value by the basic units (the sum of $x_{ij}/P_j$, for example) match the numbers in the source table at this time, it is necessary to generate a table having two rows and three columns to prevent variations in these values.

Since the original table is condensed to two rows and three columns, as described above, it is possible to calculate a solution sequence for the aforementioned n12.

There are various methods for condensing a table into two rows and three columns. For example, the first and second columns may be left unchanged while the remaining columns are combined as the third column. Alternatively, the second and third columns of the source table can be combined to form the second column, while the remaining columns are combined as the third column.

The method of condensing columns indicated in the present invention was determined because it is thought that the ratio of the n12 quantities to the margin of fluctuation is relatively stable.

Next, the n12 solution sequence calculating means 10*h* and 10*i* mentioned above will be described in greater detail based on the examples shown in FIGS. 10, 11, and 12. Here, FIG. 10 is a sample table for two-dimensional tabular data of n rows and m columns (5 rows×5 columns in this example). FIG. 11 includes 2-row, 3-column condensed sample P(0) and P(2) tables according to P0 and P2. FIG. 12 includes sample tables displaying the cell values in the P(0) and P(2) tables using two unknown quantities (in these examples, α and β, and α and β'').

From Table P(0) (FIG. 12):

$$x_{11} \equiv 0 (\mathrm{mod}\ 1789)$$

$$x_{12} \equiv 0 (\mathrm{mod}\ 1715)$$

From the above two equations, surplus of $x_{12}$ (MOD 1789) is identical to each other, hence, $$3x_{11} + x_{12} \equiv x_{12} (\mathrm{mod}\ 1789) \quad (1)$$

If this is applied to the values of Table P(0) in FIG. 12, the left side is as follows.

$$3(-1056766+\alpha) + (3058124 - 3\alpha + \beta) \equiv -112174 + \beta (\mathrm{mod}\ 1789)$$

If the surplus of (mod 1789) is taken in the above equation, $$-112174 + \beta \equiv 533 + 3 (\mathrm{mod}\ 1789) \quad (2)$$

If the unit quantity of $x_{11}$ is t and the unit quantity of $x_{12}$ is n12 using another quantity, the above equation (1) is as follows.

$$3(1789t) + (1715n12 \equiv 1715n12 (\mathrm{mod}\ 1789) \quad (3)$$

If 1715k≡1(mod 1789), then
k=1378 or k=−411
By multiplying each side of the above equation (2) by k, using the member of the residue class having the smallest absolute value as k, $$-411(533+\beta) \equiv -805 - 411\beta (\mathrm{mod}\ 1789)$$

Meanwhile, by multiplying the right side of the above equation (3) by k(−411), $$-411*1715*n12(\mathrm{mod}\ 1789) \equiv (-1789*394+1)*n12 (\mathrm{mod}\ 1789) \equiv n12 (\mathrm{mod}\ 1789)$$

Hence, $$-805 - 411\beta \equiv n12 (\mathrm{mod}\ 1789) \quad (4)$$

In the above description, P0 and P2 have already been determined. The method of determining P0 and P2 is performed according to the following criteria.

First, $P_1$ is determined to be a type equal to 4Z+1 or equal to 4Z+3. If we call the former type 1 and the latter type 2, then the expression P1−4L−1 is sequentially performed for type 1 or P1+4L+1 for type 2, where L=1, 2, . . . , N. The factors of the sequence are set to be greater than or equal to (an odd number)*(the second power of 2) and P0 is set to $P_1$ less (odd number)*2 (or 4), while P2 is set to $P_1$ plus (odd number)*2 (or 4).

In this example, $$1789-13=1776,\ 1776=48*37,\ 1789-(37*2)=1715,$$
$$1789+(37*2)=1863$$

Accordingly, 1776/(1789−1715)=24, 1776/(1789−1863)=−24 always have a plus/minus relationship.

The number 4L+1 is sufficient if the above relationship has been established.

By multiplying 4L+1 in Equation (4), $$13(-805-411\beta) \equiv 13(n12) (\mathrm{mod}\ 1789)$$

$$-10465 - 5343\beta \equiv 13(n12) (\mathrm{mod}\ 1789)$$

$$-10465 + 24\beta \equiv 13(n12) (\mathrm{mod}\ 1789)$$

If the value on the left side is −10465+24β>13(n12), then the following can be written if Q0 is the quotient when dividing by 1789.

$$-10465+12(2\beta) = 1789(Q0) + 13(n12) \quad (5)$$

Similarly, from 805+411β″=n12×13, we can write:

$$10465 - 12(2\beta) = 1789(Q2) + 13(n12)$$

From Table P(0) of FIG. 12, we have;

$$3(x11-x21) + (x12-x22) \equiv (x12-x22)(\mathrm{mod}\ 1789)$$

In the left side, we have:

$$3(-1056766+\alpha)-(1529062-\alpha)+(3058124-3\alpha+\beta)-(-2315529+3\alpha-\beta)$$

$$= -2383831 + 2\beta$$

Hence, $$-2383831 + 2\beta \equiv 1715(n12-n22)(\mathrm{mod}\ 1789)$$

$$-2383831 + 2\beta \equiv -74(n12-n22)(\mathrm{mod}\ 1789) \quad (6)$$

Similarly, from Table P(2) of FIG. 12, we have;

$$3(x11''-x21'') + (x12''-x22'') = -2447915 + 2\beta''$$

Hence, the following is satisfied.

$$-2447915 + 2\beta'' \equiv 74(n12-n22)(\mathrm{mod}\ 1789) \quad (7)$$

Therefore, from both sides of Equations (6) and (7), $$-4831746 + 2\beta + 2\beta'' \equiv 0 (\mathrm{mode}\ 1789)$$

$$-1446 + 2\beta + 2\beta'' \equiv 0 (\mathrm{mod}\ 1789)$$

$$2\beta + 2\beta'' \equiv 1446 (\mathrm{mod}\ 1789)$$

$$\beta + \beta'' \equiv 723 (\mathrm{mod}\ 1789) \quad (8)$$

Further, from B-D (the second column) in Tables P(0) and P(2) of FIG. 12, $$x12''-x12 = (1863-1715)n12 = 148n12$$

Therefore, the left side is as follows.

$$(3058124-3\alpha+\beta'')-(3058124-3\alpha+\beta) = \beta''-\beta$$

Hence, $$\beta''-\beta = 148n12 \quad (9)$$

Therefore, by setting n12=12K+NR . . . (10), $$\beta''-\beta = \mathbf{148}(12K+NR) = 1776K + 148NR$$

$$= 1789K - 13K + 148NR$$

If the surpluses on the both sides are taken, $$\beta''-\beta \equiv 13K + 148NR (\mathrm{mod}\ 1789)$$

Then, by multiplying both sides by 12, $$12(\beta''-\beta) \equiv -156K + 1776NR (\mathrm{mod}\ 1789) \quad (1)$$

From equation (5), $$-10465 + 12(2\beta) = 1789(Q0) + 13(n12)$$

$$= 1789(Q0) + 13(12K+NR) = 1789(Q0) + 156K + 13NR$$

Accordingly, $$-10465 + 12(2\beta) \equiv 1789(Q0) + 156K + 13NR (\mathrm{mod}\ 1789) \quad (12)$$

From Equations (1) and (12), $$-10465 + 12(\beta+\beta'') \equiv 1789(Q0+NR) \quad (\mathrm{mod}\ 1789)(13)$$

From Equation (8), $$12(\beta+\beta'') \equiv 8676 (\mathrm{mod}\ 1789) \quad (14)$$

From Equations (13) and (14), $$-1789 \equiv 1789(Q0+NR)(\mathrm{mod}\ 1789)$$

As a result, $Q0+NR=-1$

From Equation (5), $-10465+12(2\beta)=1789(Q0)+13(12K+NR)$ $=1776(Q0)+13(Q0)+13(12K)+13NR$ $13(Q0+NR)=-13$, the 13 can be moved to the left side.

$-10452+12(2\beta)=1776(Q0)+13(12K)$

Divide by 12.

$-871+2\beta=148(Q0)+13K$

K moves according to the range of n12 values. When finding the residue class of $2\beta$ for mod 148 when K is 15, 16, 17, and 18:

If K=15, $2\beta\equiv30$(mod 148)  (1)

If K=16, $2\beta\equiv43$  (2)

If K=17, $2\beta\equiv56$  (3)

If K=18, $2\beta\equiv69$  (4)

Hence, by substituting (1) $2\beta=148T+30$ (T=1, 2, 3, ..., 9, and 10) into the left side of equation (5) and dividing the result by P1, the quotient is 4. If the remainder is divisible by 13, the value is a target solution for n12. Here, the quotient 4 is obtained from a separate calculation.

$-10465+12(2\beta)=-10465+12(1658)=9431=1789(4)+13(175)=1789(4)+13(12x15-5)\ldots(K=15)$  (1)

$=-10465+12(1671)=9587=1789(4)+13(187)=1789(4)+13(12x16-5)\ldots(K=16)$  (2)

$=-10465+12(1684)=9743=1789(4)+13(199)=1789(4)+13(12x17-5)\ldots(K=17)$  (3)

$=-10465+12(1697)=9899=1789(4)+13(211)=1789(4)+13(12x18-5)\ldots(K=18)$  (4)

Hence, we obtain the sequence 175, 187, 199, and 211.

P1' is set in the same way. Since a new sequence is being introduced, the basic unit P' must be set to generate relatively prime numbers from K and the coefficient 12 from $2\beta$, as seen in the above example:

$n12=12K+NR, -10465+12(2\beta)$

In this example, P1' is set to 1753 which is prime to P=1789, and P0=1707, and P2=1799 are set.

$1753-5=1748\ 1748=2*23*38$ $1753-2*23=1707\ 1753+2*23=1799$ $1748/(1753-1707)=1748/46=38$ $38/2=19$ 19 and 12, which is used in P1, are relatively prime.

Figure 9:
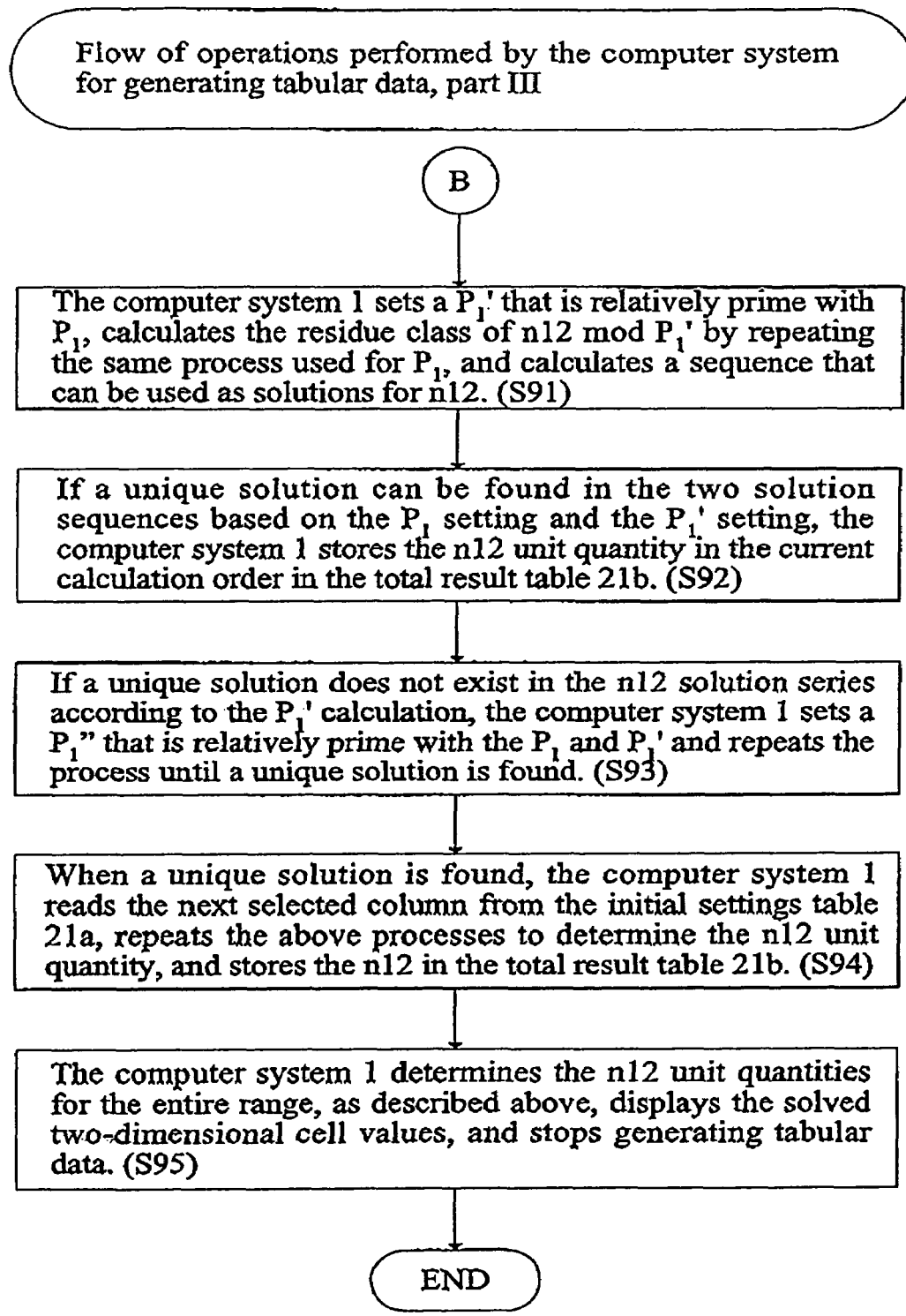
FIG. 9 shows the flow of operations performed by the computer system for generating tabular data, part III.

The data of FIG. 9 is condensed to 2 rows and 3 columns as follows by changing rows and totaled values of the columns by a predetermined operation not to change n12, so as to obtain Tables P(0)" and P(2)".

| x11 | x12 | x13 | Total |
|---|---|---|---|
| $-1057010 + \alpha$ | $3039604 - 3\alpha + \beta$ | | 679384 |

-continued

| x21 | x22 |
|---|---|
| $1519802 - \alpha$ | $-2300473 + 3\alpha - \beta$ |
| x11" | x12" |
| $-1057010 + \alpha$ | $3039604 - 3\alpha + \beta$" |
| x21" | x22" |
| $1519802 - \alpha$ | $-2260637 + 3\alpha - \beta$" |

As similar to $P_1$, $3x11+x12\equiv x12(\text{mod }1753)$  (15)

The left side is as follows.

$3(-1057010+\alpha)+3039604-3\alpha+\beta=-131426+\beta$ $-131426+\beta\equiv-1704+\beta(\text{mode }1753)$  (16)

$1707k\equiv1(\text{mod }1753)$

By doing so, we obtain:

$k=1410$ or $k=-343(\text{mod }1753)$

Multiplying the above equation (16) by $k=-343$, $-343(-1704+\beta)\equiv723-343\beta(\text{mod }1753)$ From the right side of Equation (15), $723-343\beta\equiv n12(\text{mod }1753)$ Further multiplying by 5, $3615-1715\beta\equiv5n12(\text{mod }1753)$ $3615+19(2\beta)\equiv5n12(\text{mod }1753)$ When the value on the left side satisfies $3615+38\beta>5$ (n12) and the quotient by dividing by 1753 is denoted as Q0, we can write:

$3615+19(2\beta)=1753(Q0)+5(n12)$  (17)

Next, when n12=19K+NR, the same equation described above will be performed to obtain Q0+NR=20 (abbreviated version).

$3515+19(2\beta)=1748(Q0)+5(19K)$

Dividing by 19, $185+(2\beta)=92(Q0)+5K$

Finding $2\beta$ for values of K=9, 10, and 11:

If $K=9$, $2\beta\equiv44(\text{mod }92)$  (1)

If K=10, $2\beta\equiv49$  (2)

If K=11, $2\beta\equiv54$  (3)

Then by similarly substituting (1) $2\beta=92T+44$ (T=1, 2, 3, ..., 9, and 10) into the left side of equation (17) and dividing by P1', the quotient is 1. If the remainder is divisible by 5, then the value becomes a solution for n12.

$3615+19(2\beta)=3615+19(872)=20183=1753(1)+5(180)=1753(1)+5(19x9+9)\ldots(K=9)$  (1)

$=3615+19(877)=20278=1753(1)+5(199)=1753(1)+5(19x10+9)\ldots(K=10)$  (2)

$=3615+19(882)=20373=1753(1)+5(218)=1753(1)+5(19x11+9)\ldots(K=1)$  (3)

Therefore, solution sequences as n12 can be 180, 199, 218.

The sole duplicated solutions of n12 in $P_1$ and P1' can be found as 199.

INDUSTRIAL APPLICABILITY

The computer system for generating tabular data according to the present invention has the following effects.

Due to differences in the economic environment and other circumstances, individual businesses create data with various attributes, items, and their definitions. For this reason, companies have not always been able to fully make use of their company data in association with various corporate information provided from external institutions including general public organizations. However, this computer system for generating tabular data can understand the position of the company amid economic and administrative changes and can provide a link with external data to facilitate analysis of the company's own data, while acquiring useful data for corporate management.

The invention claimed is:

1. A computer system for generating tabular data,
the tabular data comprising:
  cell data $s_{ij}$ (where i=1, 2, . . . , and n; and j=1, 2, . . . , and m) arranged two-dimensionally in n rows and m columns and including numerical data used in corporate management that has been compiled and sorted based on attributes for the rows and columns;
  two sets of one-dimensional data having different attributes that include totaled values $y_{ti}$ (where i=1, 2, . . . , and n) for the m cell values in each row and totaled values $x_{tj}$ (where j=1, 2, . . . , and m) for the n cell values in each column; and
  one-dimensional data for basic units $P_j$ (where j=1, 2, . . . , and m), which are constant quantities shared in the respective columns such that the values in the n cells of each column are multiples of the constant quantity and the prime factors of the constant quantities in each column differ at least partially;
  wherein the totaled values $x_{tj}$ and their basic units $P_j$ are compiled based on company attributes determined in-house, while the totaled values $y_{ti}$ are set to one-dimensional data compiled according to attributes set outside of the company;
  the computer system comprising various means for finding partial data, wherein the values $x_{tj}$, $P_j$, and $y_{ti}$ are known quantities and the cell data $s_{ij}$ for each of the n×m cells are unknown quantities;
  the computer system further comprising:
  initializing means for setting internal data and modified data for external data, displaying a settings input window for inputting rows and columns indicating a range of the cells for which a solution is to be found and the order for selecting rows and columns within that range, and storing the inputted data in an initial settings table;
  basic units plus/minus differential generating means for selecting one column from the initial settings table according to the selection order set by the initializing means, setting $P_1$ to the basic units $P_j$ of the totaled value $x_{tj}$ in the selected column, and generating two basic units P(0) and P(2) having the same differential with $P_1$, but one being less than $P_1$ and the other greater;
  P(0) table generating means for creating a 2-row, 3-column condensed table using P(0) by setting a totaled value $y_{t1}'$ in the first row of a P(0) table to the value of $y_{ti}$ in the selected row, setting a totaled value $y_{t2}'$ in the second row to the total of all values $y_{t2}$-$y_{tm}$ of rows not selected; setting a totaled value $x_{t1}'$ in the first column of the P(0) table to the value of $x_{tj}$ in the selected row, setting a totaled value $x_{t2}'$ in the second column to a value found from the expression $P(0)(x_{t2}/P_2 + x_{t3}/P_3 + \ldots + x_{tm-1}/P_{m-1})$ using the totaled values $x_{t2}, x_{t3}, x_{t4}, \ldots$ for all columns not selected, but excluding the totaled value $x_{tm}$ in the final column, and setting a totaled value $x_{t3}'$ in the third column to a value found the expression $(P_2-P(0))(x_{t2}/P_2)+(P_3-P(0))(x_{t3}/P_3)+ \ldots +(P_{m-1}-P(0))(x_{t,m-1}/P_{m-1})+x_{tm}$ to condense the original table to three columns;
  P(2) table generating means for generating a 2-row, 3-column condensed table according to the same method as the P(0) table generating means described above, but using P(2) in place of P(0);
  2-row, 3-column condensed table cell value displaying means that expresses the six cell values $x_{ij}$ (for line numbers i=1 and 2 and column numbers j=1, 2, and 3) according to the following equations, using known quantities a, b, and c as the totaled values for the first, second, and third columns in the 2-row by 3-column condensed table and known quantities d and e as the totaled values in the first and second rows, and employing unknown quantities α and β:

$x_{11} = -2(a+b+c)+3d+\alpha$ $x_{21} = 3a+2(b+c)-3d-\alpha$ $x_{12} = 6a+4(b+c)-6d-3\alpha+\beta$ $x_{22} = -6a-3b-4c+6d+3\alpha-\beta$ $x_{13} = -4a-2(b+c)+4d+2\alpha-\beta$ $x_{23} = 4a+2b+3c-4d-2\alpha+\beta;$ n12 generating means for generating a unit quantity n12 for the cells $s_{12}'$ and $s_{12}''$ in the corresponding P(0) and P(2) tables by totaling the unit quantities for all cells of the original tabular data prior to condensing the data, from the cell $s_{12}$ in the first row and the second column to the cell $s_{1,m-1}$ in the first row and $(m-1)^{th}$ column but excluding the cell $s_{1m}$ in the final column, according to the equation $n12 = s_{12}/P_2 + s_{13}/P_3 + \ldots + s_{1,m-1}/P_{m-1}$;
  n12 solution sequence calculating means for finding solutions of cell unit quantities n12 based on the $P_1$ setting by calculating the residue class of the cell unit quantities n12 mod $P_1$ based on the totaled values for each of the 2-row, 3-column condensed P(0) and P(2) tables and the basic units $P_1$, P(0), and P(2), and calculating and displaying a sequence that can be used as solutions for n12; and
  selected n12 unit quantity sequential calculating means for setting $P_1'$ to include factors relatively prime with $P_1$, generating two basic units P'(0) and P'(2) having the same differential with $P_1'$, with one less than $P_1'$ and the other greater, using the same means used for $P_1$, generating P'(0) and P'(2) tables condensed to two rows and three columns, calculating the residue class of n12 mod $P_1'$ based on the totaled values in the P'(0) and P'(2) tables and the basic units $P_1'$, P'(0), and P'(2), and calculating a sequence that can be used as solutions for n12, fixing a unit quantity for the n12 of the current column selected by the initializing means if a unique solution exists in the overlapping area between the solution sequence for n12 based on the $P_1$ setting and the solution sequence for n12 based on the $P_1'$ setting found by said solution n12 sequence calculating means, setting a $P_1''$ having factors relatively prime with $P_1$ and $P_1'$, repeating the process to calculate the n12 solution sequence if the n12 solution sequence according to the $P_1$ setting and the n12 solution sequence according to the P1' setting include a plurality of overlapping solutions, fixing a unit quantity for the n12 of the current column selected by the initializing means, storing this quantity in a total results table, searching the initial settings table and reading the next column that should be selected in the order of calculation, moving the selected column to the first column and repeating each of the means described above to determine the unit quantity of n12; reading the selected column for the next row from the initial settings table if all unit quantities n12 have been determined for that row and repeating the steps described above for determining the n12 unit quantity; and stopping data recording to the total results table after finding all unit quantities n12 in the cell range set in the initial settings table.

2. The computer system for generating tabular data according to claim 1, wherein the totaled values $x_{tj}$, one-dimensional data compiled in-house, indicate total sales for products sold to a plurality of retailers; the basic units $p_j$ indicate the unit costs of the sold products; and the totaled values $y_{tj}$, one-dimensional data determined and compiled externally, indicate total sales by end-user that have been recategorized and ordered according to data received from each retailer.

3. A computer system configured to generate tubular data, comprising:

a processor; and a memory coupled to said processor;

the memory having stored therein sequences of instructions which, when executed by said processor, cause said processor to generate tabular data by causing the processor to perform the steps of:

finding partial data, wherein the values $x_{tj}$, $P_j$, and $y_{ti}$ are known quantities and the cell data $s_{ij}$ for each of the n*m cells are unknown quantities;

setting internal data and modified data for external data, displaying a settings input window for inputting rows and columns indicating a range of the cells for which a solution is to be found and the order for selecting rows and columns within that range, and storing the inputted data in an initial settings table;

selecting one column from the initial settings table according to the selection order set by the initializing steps, setting $P_1$ to the basic unit $P_j$ of the totaled value $x_{tj}$ in the selected column, and generating two basic units P(0) and P(2) having the same differential with $P_1$, but one being less than $P_1$ and the other greater;

creating a 2-row, 3-column condensed table using P(0) by setting a totaled value $y_{t1}'$ in the first row of a P(0) table to the value of $y_{ti}$ in the selected row, setting a totaled value $y_{t2}'$ in the second row to the total of all values $y_{t2}$-$y_{tn}$ of rows not selected; setting a totaled value $x_{t1}'$ in the first column of the P(0) table to the value of $x_{tj}$ in the selected row, setting a totaled value $x_{t2}'$ in the second column to a value found from the expression $P(0)(x_{t2}/P_2+x_{t3}/P_3+ \ldots +X_{tm-1}/P_{m-1})$ using the totaled values $x_{t2}$, $x_{t3}$, $x_{t4}$, ... for all columns not selected, but excluding the totaled value $x_{tm}$ in the final column, and setting a totaled value $x_{t3}'$ in the third column to a value found the expression $(P_2-P(0))(x_{t2}/P_2)+(P_3-P(0))(x_{t3}/P_3)+ \ldots +(P_{m-1}-P(0))(x_{t,m-1}/P_{m-1})+x_{tm}$ to condense the original table to three columns;

generating a 2-row, 3-column condensed table according to the same method as the P(0) table generating step described above, but using P(2) in place of P(0);

displaying the six cell values $x_{ij}$ (for line numbers i=1 and 2 and column numbers j=1, 2, and 3) according to the following equations, using known quantities a, b, and c as the totaled values for the first, second, and third columns in the 2-row by 3-column condensed table and known quantities d and e as the totaled values in the first and second rows, and employing unknown quantities α and β:

$x_{11}=-2(a+b+c)+3d+\alpha$ $x_{21}=3a+2(b+c)-3d-\alpha$ $x_{12}=6a+4(b+c)-6d-3\alpha+\beta$ $x22=-6a-3b-4c+6d+3\alpha-\beta$ $x13=-4a-2(b+c)+4d+2\alpha-\beta$ $x23=4a+2b+3c-4d-2\alpha+\beta;$ generating a unit quantity n12 for the cells $s_{12}'$ and $s_{12}''$ in the corresponding P(0) and P(2) tables by totaling the unit quantities for all cells of the original tabular data prior to condensing the data, from the cell $s_{12}$ in the first row and the second column to the cell $s_{1,m-1}$ in the first row and $(m-1)^{th}$ column but excluding the cell $s_{1m}$ in the final column, according to the equation $n12=s_{12}/P_2+s_{13}/P_3+ \ldots +s_{1,m-1}/P_{m-1};$ finding solutions of cell unit quantities n12 based on the $P_1$ setting by calculating the residue class of the cell unit quantities n12 mod $P_1$ based on the totaled values for each of the 2-row, 3-column condensed P(0) and P(2) tables and the basic units $P_1$, P(0), and P(2), and calculating and displaying a sequence that can be used as solutions for n12;

calculating the cell unit quantities n12 based on a $P_1'$ setting by setting $P_1'$ to include factors relatively prime with $P_1$, generating two basic units P'(0) and P'(2) having the same differential with $P_1'$, with one less than $P_1'$ and the other greater, using the same step used for $P_1$, generating P'(0) and P'(2) tables condensed to two rows and three columns, calculating the residue class of n12 mod $P_1'$ based on the totaled values in the P'(0) and P'(2) tables and the basic units $P_1'$, P'(0), and P'(2), and calculating and displaying a sequence that can be used as solutions for n12; and fixing a unit quantity for the n12 of the current column selected by the initializing step if a unique solution exists in the overlapping area between the solution sequence for n12 based on the $P_1$ setting and the solution sequence for n12 based on the $P_1'$ setting found by the solution n12 sequence calculating step setting a $P_1''$ having factors relatively prime with $P_1$ and $P_1'$, repeating the process to calculate the n12 solution sequence if the n12 solution sequence according to the $P_1$ setting and the n12 solution sequence according to the $P_1'$ setting include a plurality of overlapping solutions, fixing a unit quantity for the n12 of the current column selected by the initializing step, storing this quantity in a total results table, searching the initial settings table and reading the next column that should be selected in the order of calculation, moving the selected column to the first column and repeating each of the steps described above to determine the unit quantity of n12; reading the selected column for the next row from the initial settings table if all unit quantities n12 have been determined for that row and repeating the steps described above for determining the n12 unit quantity; and stopping data recording to the total results table after finding all unit quantities n12 in the cell range set in the initial settings table.

4. The computer system configured to generate tabular data according to claim 3, wherein the tabular data used for cooperate management comprise;

cell data $s_{ij}$ (where i=1, 2, ..., and n; and j=1, 2, ..., and m) arranged two-dimensionally in n rows and m columns and including numerical data used in corporate management that has been compiled and sorted based on attributes for the rows and columns;

two sets of one-dimensional data having different attributes that include totaled values $y_{ti}$ (where i=1, 2, ..., and n) for the m cell values in each row and totaled values $x_{tj}$ (where j=1, 2, ..., and m) for the n cell values in each column; and one-dimensional data for basic units $P_j$ (where j=1, 2, ..., and m), which are constant quantities shared in the respective columns such that the values in the n cells of each column are multiples of the constant quantity and the prime factors of the constant quantities in each column differ at least partially;

wherein the totaled values $x_{tj}$ and their basic units $P_j$ are compiled based on company attributes determined in-house, while the totaled values $y_{ti}$ are set to one-dimensional data compiled according to attributes set outside of the company.

5. The computer system configured to generate tabular data according to claim 3, wherein the totaled values $x_{tj}$, one-dimensional data compiled in-house, indicate total sales for products sold to a plurality of retailers; the basic units $p_j$ indicate the unit costs of the sold products; and the totaled values $y_{tj}$, one-dimensional data determined and compiled externally, indicate total sales by end-user that have been recategorized and ordered according to data received from each retailer.

6. A method for generating tabular data, comprising the steps of:

finding partial data, wherein the values $x_{tj}$, $P_j$, and $y_{ti}$ are known quantities and the cell data $s_{ij}$ for each of the n*m cells are unknown quantities;

setting internal data and modified data for external data, displaying a settings input window for inputting rows and columns indicating a range of the cells for which a solution is to be found and the order for selecting rows and columns within that range, and storing the inputted data in an initial settings table;

selecting one column from the initial settings table according to the selection order set by the initializing steps, setting $P_1$ to the basic unit $P_j$ of the totaled value $x_{tj}$ in the selected column, and generating two basic units P(0) and P(2) having the same differential with $P_1$, but one being less than $P_1$ and the other greater;

creating a 2-row, 3-column condensed table using P(0) by setting a totaled value $y_{t1}'$ in the first row of a P(0) table to the value of $y_{ti}$ in the selected row, setting a totaled value $y_{t2}'$ in the second row to the total of all values $y_{t2}$-$y_{tm}$ of rows not selected; setting a totaled value $x_{t1}'$ in the first column of the P(0) table to the value of $x_{tj}$ in the selected row, setting a totaled value $x_{t2}'$ in the second column to a value found from the expression $P(0)(x_{t2}/P_2+x_{t3}/P_3+ \ldots +x_{tm-1}/P_{m-1})$ using the totaled values $x_{t2}, x_{t3}, x_{t4}, \ldots$ for all columns not selected, but excluding the totaled value $x_{tm}$ in the final column, and setting a totaled value $x_{t3}'$ in the third column to a value found the expression $(P_2-P(0))(x_{t2}/P_2)+(P_3-P(0))(x_{t3}/P_3)+ \ldots +(P_{m-1}-P(0))(x_{t,m-1}/P_{m-1})+x_{tm}$ to condense the original table to three columns;

generating a 2-row, 3-column condensed table according to the same method as the P(0) table generating step described above, but using P(2) in place of P(0);

displaying the six cell values $x_{ij}$ (for line numbers i=1 and 2 and column numbers j=1, 2, and 3) according to the following equations, using known quantities a, b, and c as the totaled values for the first, second, and third columns in the 2-row by 3-column condensed table and known quantities d and e as the totaled values in the first and second rows, and employing unknown quantities α and β:

$x_{11}=-2(a+b+c)+3d+\alpha$ $x_{21}=3a+2(b+c)-3d-\alpha$ $x12=6a+4(b+c)-6d-3\alpha+\beta$ $x22=-6a-3b-4c+6d+3\alpha-\beta$ $x13=-4a-2(b+c)+4d+2\alpha-\beta$ $x23=4a+2b+3c-4d-2\alpha+\beta;$ generating a unit quantity n12 for the cells $s_{12}'$ and $s_{12}''$ in the corresponding P(0) and P(2) tables by totaling the unit quantities for all cells of the original tabular data prior to condensing the data, from the cell $s_{12}$ in the first row and the second column to the cell $s_{1,m-1}$ in the first row and $(m-1)^{th}$ column but excluding the cell $s_{1m}$ in the final column, according to the equation $n12=s_{12}/P_2+s_{13}/P_3+ \ldots +s_{1,m-1}/P_{m-1}$;

finding solutions of cell unit quantities n12 based on the $P_1$ setting by calculating the residue class of the cell unit quantities n12 mod $P_1$ based on the totaled values for each of the 2-row, 3-column condensed P(0) and P(2) tables and the basic units $P_1$, P(0), and P(2), and calculating and displaying a sequence that can be used as solutions for n12;

calculating the cell unit quantities n12 based on a $P_1'$ setting by setting $P_1'$ to include factors relatively prime with $P_1$, generating two basic units P'(0) and P'(2) having the same differential with $P_1'$, with one less than $P_1'$ and the other greater, using the same step used for $P_1$, generating P'(0) and P'(2) tables condensed to two rows and three columns, calculating the residue class of n12 mod $P_1'$ based on the totaled values in the P'(0) and P'(2) tables and the basic units $P_1'$, P'(0), and P'(2), and calculating and displaying a sequence that can be used as solutions for n12; and fixing a unit quantity for the n12 of the current column selected by the initializing step if a unique solution exists in the overlapping area between the solution sequence for n12 based on the $P_1$ setting and the solution sequence for n12 based on the $P_1'$ setting found by the solution n12 sequence calculating step, setting a $P_1''$ having factors relatively prime with $P_1$ and $P_1'$, repeating the process to calculate the n12 solution sequence if the n12 solution sequence according to the $P_1$ setting and the n12 solution sequence according to the $P_1'$ setting include a plurality of overlapping solutions, fixing a unit quantity for the n12 of the current column selected by the initializing step, storing this quantity in a total results table, searching the initial settings table and reading the next column that should be selected in the order of calculation, moving the selected column to the first column and repeating each of the steps described above to determine the unit quantity of n12; reading the selected column for the next row from the initial settings table if all unit quantities n12 have been determined for that row and repeating the steps described above for determining the n12 unit quantity; and stopping data recording to the total results table after finding all unit quantities n12 in the cell range set in the initial settings table.

7. The method for generating tabular data according to claim 6, wherein the tabular data used for cooperate management comprise:

cell data $s_{ij}$ (where i=1, 2, ..., and n; and j=~1, 2, ..., and m) arranged two-dimensionally in n rows and m columns and including numerical data used in corporate management that has been compiled and sorted based on attributes for the rows and columns;

two sets of one-dimensional data having different attributes that include totaled values $y_{ti}$ (where i=1, 2, ..., and n) for the m cell values in each row and totaled values $x_{tj}$ (where j=1, 2, ..., and m) for the n cell values in each column; and one-dimensional data for basic units $P_j$ (where j=1, 2, ..., and m), which are constant quantities shared in the respective columns such that the values in the n cells of each column are multiples of the constant quantity and the prime factors of the constant quantities in each column differ at least partially;

wherein the totaled values $x_{tj}$ and their basic units $P_j$ are compiled based on company attributes determined in-house, while the totaled values $y_{ti}$ are set to one-dimensional data compiled according to attributes set outside of the company.

8. The method for generating tabular data according to claim 6, wherein the totaled values $x_{tj}$, one-dimensional data compiled in-house, indicate total sales for products sold to a plurality of retailers; the basic units $p_j$ indicate the unit costs of the sold products; and the totaled values $y_{tj}$, one-dimensional data determined and compiled externally, indicate total sales by end-user that have been recategorized and ordered according to data received from each retailer.

* * * * *